Aug. 21, 1945.   J. A. MacLEAN, JR   2,383,068
BOLT AND MOUNTING THEREFOR
Filed July 10, 1943
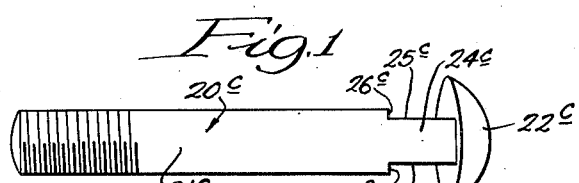
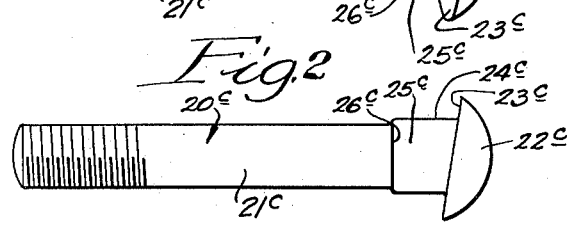
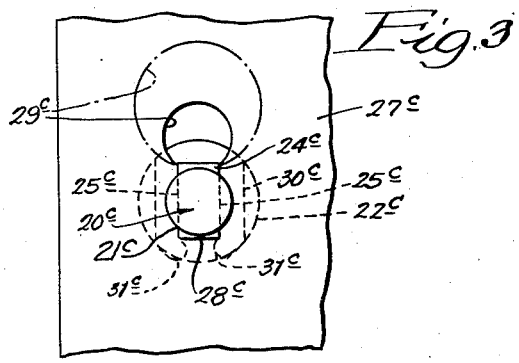
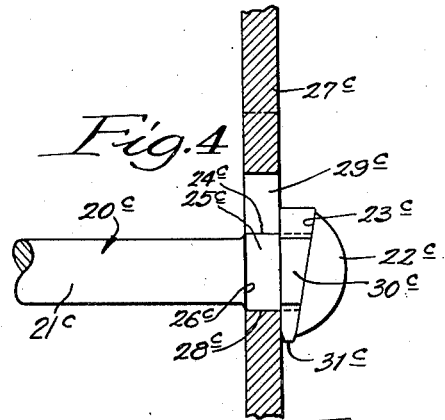
Inventor:
John A. MacLean Jr.,
By McCabb, Hunt Navy Dickinson
Attorneys.

Patented Aug. 21, 1945

2,383,068

UNITED STATES PATENT OFFICE 2,383,068

BOLT AND MOUNTING THEREFOR

John A. MacLean, Jr., Winnetka, Ill., assignor to MacLean-Fogg Lock Nut Company, Chicago, Ill., a corporation of Illinois Application July 10, 1943, Serial No. 494,137

2 Claims. (Cl. 85—1)

My invention relates to bolts and mountings therefor.

It is particularly concerned with a bolt to be mounted at its head end in a slot in a plate, or plate-like flange, of a structural member in such a manner that the bolt is rigidly mounted with its thread shank outstanding even before assembly thereon of whatever the bolt is to mount. Such a bolt mounting is especially useful where there is a set of such bolts to be received simultaneously into respective correspondingly spaced bolt holes in a strip or panel. As the bolts are mounted first and the strip or panel then applied, it is necessary that the bolt shanks be maintained outstanding in parallelism with each other. The bolts should also be so mounted as to withstand the radial thrusts and blows to which they may be subjected before, during and after application of the strip or panel.

The objects of the present invention are: to compensate for wider working tolerances in the thickness of the plate which carries the mounting slot, or in the length of the neck of the bolt, or in both—and yet maintain a very tight and rigid mounting; and to permit the use of a narrower mounting slot as the result of a narrower bolt neck.

The foregoing together with further objects, features and advantages are set forth in the following description of specific embodiments of my invention as illustrated in the accompanying drawing wherein:

Fig. 1 is a plan view of a bolt embodying my invention;

Fig. 2 is a side elevation thereof; and

Figs. 3 and 4 are, respectively, end and side views illustrating the mounting of the bolt in use.

The bolt 20c of Figs. 1 to 4 comprises a shank 21c threaded inwardly from its free end, a head 22c presenting a flat shoulder 23c at an angle to the axis, a narrowed neck 24c defined by parallel diametrically opposed chordal flats 25c, and a pair of headwardly facing shank shoulders 26c at the shank ends of the flats. The neck is considerably longer than the thickness of a plate 27c in which it is to be mounted, as shown in Fig. 4. The head shoulders 23c are inclined to the lower edge.

The mounting plate 27c (Fig. 4), which may either be a true plate or a plate-like flange of an angle, channel or Z-shaped bar, is provided with a mounting slot 28c through its thickness. When the slot is not placed to lead inwardly from an edge of the plate, it is associated with an enlargement 29c big enough to pass the shank of the bolt, so the mounting slot 28c and the enlargement 29c together constitute a keyhole shaped opening.

The clip 30c is generally U-shaped, or preferably horseshoe shaped by virtue of the inward lugs 31c at the lower ends of its legs which may be included to snap over the bottom edge of the neck to help retain the clip upon the neck. The front and rear faces of the clip are relatively inclined to give the clip a wedge taper agreeable with the inclination of the head shoulders 23c.

To mount the bolt, the shank is passed through the enlarged opening 29c of the plate. Then the bolt, held horizontally in the hand, is shifted downwardly to seat the neck in the mounting slot 28c. Next, the clip 30c is set astride the neck, where it protrudes rearwardly of the plate, and is driven down over the neck by a hammer blow. The wedge clip co-acts with the inclined head shoulders 26c and with the rear face of the plate to cam the bolt axially. This draws the shank shoulder 23c firmly and flatwise against the front face of the plate and thereby positions the outstanding shank at a normal to the plate. The angle of the clip wedge being the same as the angle of the head shoulders, the front face of the clip is brought into firm flatwise contact with the rear face of the plate, further insuring that the shank will rigidly outstand from the plate at a normal thereto.

In the mounted assembly, the clip thus becomes virtually a collar spaced from the shank shoulders by the thickness of the plate; and this regardless of considerable production variations in the thickness of the plate or in the length of the neck, since the clip need not be driven down to any fixed vertical position relative to the bolt.

The axial clamping strain of the nut upon the bolt is taken by the large integral head, and not by the small shank shoulders or separate clip.

By making the neck of the bolt narrower than the shank, the manufacture of the bolt is simplified, for the neck can easily be formed by cutting away the sides of the original shank, or preferably by stamping flat the head end of the shank. In either case the shank shoulder is readily formed as an incident to the flattening of the neck. Also, the narrower neck takes a narrower mounting slot with consequently less weakening of the mounting plate.

Despite the narrower neck, the bolt's strength is not impaired to the extent which may at first appear. The tightly wedged clip serves as a buttress between the shank and plate to help the narrower neck to resist lateral bending strains. And the heavy frictional contact between the plate and the clip, which is not rotatable upon the bolt, helps relieve the neck of much of the tortional strain in resisting turning of the nut.

In the form shown in Figs. 1 to 4 inclusive, the shank shoulders 20c of the bolt 20c are formed square, and the head 22c is set askew, whereby the head shoulder 23c lies at an angle to the axis. This form may be employed to advantage in certain installations where it is essential that the shank diameter be not exceeded on the front side of the plate (as where the bolt hole in the thing to be clamped cannot be counter bored to accommodate a collar or clip) and where there is sufficient clearance behind the plate, and sufficient access thereto, for the installation of the clip.

While I have illustrated and described these several specific embodiments of my invention, I contemplate that many changes and substitutions may be made without departing from the scope of my invention.

I claim:

1. A bolt comprising a shank threaded rearwardly from its forward end, a head at the rear end of the bolt presenting a forwardly-facing shoulder, a neck adjoining the head shoulder and having substantially parallel chordal flats, rearwardly-facing shank shoulders lying in a common plane and formed by the rear end of the shank at the forward ends of the flats, the plane of the aforesaid forwardly facing shoulder being oblique to the axis of the shank and the common plane of the shank shoulders being at a normal to the axis of the shank, and a U-shaped wedge-like retainer adapted to straddle the bolt neck, with the retainer legs extending alongside the neck flats, and to lie between the forwardly facing shoulder of the bolt head and the rear face of a plate through which the neck extends and against the front face of which the shank shoulders of the bolt bear.

2. A bolt comprising a shank threaded rearwardly from its forward end, a head at the rear end of the bolt presenting a forwardly-facing shoulder, a neck adjoining the head shoulder and having substantially parallel chordal flats, and rearwardly-facing shank shoulders lying in a common plane and formed by the rear end of the shank at the forward ends of the flats, the plane of the aforesaid forwardly facing shoulder being oblique to the axis of the shank and the common plane of the shank shoulders being at a normal to the axis of the shank.

JOHN A. MacLEAN, Jr.